(12) United States Patent
Scholz et al.

(10) Patent No.: US 12,139,189 B2
(45) Date of Patent: Nov. 12, 2024

(54) SPINDLE DEVICE AND STEERING DEVICE HAVING SUCH A SPINDLE DEVICE

(71) Applicant: ZF Automotive Germany GmbH, Alfdorf (DE)

(72) Inventors: Andreas Scholz, Duisburg (DE); Sebastian Frasch, Bielefeld (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 18/483,153

(22) Filed: Oct. 9, 2023

(65) Prior Publication Data
US 2024/0116556 A1    Apr. 11, 2024

(30) Foreign Application Priority Data
Oct. 7, 2022  (DE) .......................... 102022210633.4

(51) Int. Cl.
*B62D 1/181*  (2006.01)
*B62D 1/185*  (2006.01)

(52) U.S. Cl.
CPC ............. *B62D 1/181* (2013.01); *B62D 1/185* (2013.01)

(58) Field of Classification Search
CPC .................................. B62D 1/181; B62D 1/185
See application file for complete search history.

(56) References Cited

U.S. PATENT DOCUMENTS

| | | | | |
|---|---|---|---|---|
| 2008/0314190 A1* | 12/2008 | Miyawaki | .............. | B62D 1/185 74/496 |
| 2023/0294753 A1* | 9/2023 | Ehrmann | ............... | B62D 1/181 74/493 |

* cited by examiner

*Primary Examiner* — Faye M Fleming
(74) *Attorney, Agent, or Firm* — Kristin L. Murphy

(57) ABSTRACT

A spindle device has a spindle rod and a spindle nut, wherein an internal thread of the spindle nut interacts with an external thread of the spindle rod, and the spindle rod and/or the spindle nut can be rotated about a longitudinal axis of the spindle rod. At least one bearing device is provided, in which the spindle rod or the spindle nut is mounted. The bearing device allows compensating movements, which are oriented at least radially to the longitudinal axis, for the spindle rod and/or the spindle nut. To compensate for tolerances of the spindle rod and/or the spindle nut, while at the same time intending to ensure a high degree of stiffness in the axial direction of the longitudinal axis, the bearing device has a plurality of elastically deformable bars for realizing the compensating movements.

19 Claims, 11 Drawing Sheets

SPINDLE DEVICE AND STEERING DEVICE HAVING SUCH A SPINDLE DEVICE

CROSS-REFERENCE TO RELATED APPLICATION

This application claims priority to German Priority Application No. 102022210633.4, filed Oct. 7, 2022, the disclosure of which is incorporated herein by reference in its entirety.

TECHNICAL FIELD

The disclosure relates to a spindle device having a spindle rod and having a spindle nut and at least one bearing device in which the spindle rod or the spindle nut is mounted. Furthermore, the disclosure relates to a steering device for a motor vehicle, having an electromechanical adjusting device for adjusting a steering column, wherein the electromechanical adjusting device has an aforementioned spindle device.

BACKGROUND

Spindle devices are known from WO 02/077487 A2. According to this document, an axial and radial bearing is provided for a spindle nut and is designed both for tilting movements of the spindle nut about its longitudinal axis and for radial movements transversely with respect to its longitudinal axis. For this purpose, flanges of a housing are designed to be elastic. This type of bearing device allows, inter alia, elastic deflection in the axial direction of the longitudinal axis.

For example, in a steering device for a vehicle in which an electromechanical adjusting device has a spindle device for adjusting a steering column, a deflection in the axial direction is, by contrast, rather undesired or even impermissible. In some arrangements, the spindle device of a steering device is designed to be self-locking and has as little as play as possible, if any, in the axial direction of the longitudinal axis. For a crash function integrated into the steering device and/or for the functionality of an energy-absorption device in the event of an accident, a high degree of stiffness in the axial direction of the longitudinal axis is desired.

Owing to production-related tolerances, the spindle rod and/or the spindle nut of the spindle device can have out-of-roundness. In a steering device, for example having a plurality of spindle devices, this can lead to undesirably high friction or, in the extreme case, to jamming.

SUMMARY

What is needed is to further develop a spindle device and/or a steering device of the type stated at the outset in such a way that tolerances of a spindle rod and/or spindle nut can be compensated for, while at the same time ensuring a high degree of stiffness in the axial direction of the longitudinal axis. An alternative arrangement is intended to be provided.

A spindle device and a steering device is disclosed herein. Exemplary arrangements of the disclosure can be found in the claims and in the following description.

In one exemplary arrangement, the spindle device has a spindle rod and a spindle nut. Such spindle devices can be used in various applications and technical fields, for example in machine tools. Such spindle devices are used in vehicles, for example in the steering system or in a steering device for a motor vehicle.

An internal thread of the spindle nut interacts with an external thread of the spindle rod, wherein the spindle rod and/or the spindle nut can be rotated about a longitudinal axis of the spindle rod. For example, either the spindle rod or the spindle nut is fixed. In the case of a fixed spindle rod, the spindle nut can be rotated, and in the case of a fixed spindle nut, the spindle rod can be rotated. In one exemplary arrangement, the rotatable spindle rod or the rotatable spindle nut can be driven by a drive, such as, for example, an electric motor. The drive can be a constituent part of the spindle device. The spindle device makes it possible for components connected to the spindle rod and/or to the spindle nut to be moved or displaced in the axial direction of the longitudinal axis of the spindle rod.

The spindle device has at least one bearing device. The spindle rod or the spindle nut is mounted in the bearing device. Here, the bearing device allows compensating movements, which are oriented at least radially to the longitudinal axis, for the spindle rod and/or the spindle nut. According to the disclosure, the bearing device has a plurality of elastically deformable bars for realizing the compensating movements.

It is advantageous here that, by virtue of the elastically deformable bars, tolerances of a spindle rod and/or spindle nut, for example radially or exclusively radially to the longitudinal axis, can be compensated for, while at the same time a high degree of stiffness in the axial direction of the longitudinal axis is ensured. The elastically deformable bars thus make it possible in a simple manner to compensate, for example, for out-of-roundness of the spindle rod and/or the spindle nut. In one exemplary arrangement, the bars are elastically deformable transversely or at right angles to their longitudinal extent. For example, the bars are stiff in the axial direction with respect to their longitudinal extent or stiffer than in the radial direction with respect to their longitudinal extent. The elastically deformable bars can be formed from a metal or spring steel.

The elastically deformable bars can be arranged in such a way that compensating movements which are required to compensate for tolerances, i.e., radially or exclusively radially to the longitudinal axis, are made possible by virtue of a low degree of stiffness. By contrast, movements in directions in which a force or a torque is intended to be transmitted, in particular in the axial direction of the longitudinal axis, are prevented or reduced by virtue of a high degree of stiffness of the bars. Depending on desired compensating movements, the arrangement of the elastically deformable bars can be different.

In one exemplary arrangement, the bearing device allows translational and/or rotational compensating movements with respect to the longitudinal axis by the elastically deformable bars. For example, translational compensating movements radially to the longitudinal axis are made possible by the elastically deformable bars. In one exemplary arrangement, translational compensating movements in the axial direction of the longitudinal axis are blocked on account of the bars. Depending on an arrangement of the elastically deformable bars, rotational compensating movements can be made possible radially to the longitudinal axis and blocked axially to the longitudinal axis. In another arrangement of the elastically deformable bars, rotational compensating movements can be blocked radially to the longitudinal axis and made possible axially to the longitudinal axis. Rotational compensating movements can correspond to a tilting movement or turning movement, for example about a centre point of the bearing device.

In one exemplary arrangement, the bearing device has a first end and a second end facing away from the first end. For example, the bearing device extends in the longitudinal direction of the longitudinal axis of the spindle rod. A hollow cylindrical inner sleeve of the bearing device extends from the first end up to the second end. Here, the spindle rod or the spindle nut is rotatably mounted in the inner sleeve. A cylindrical portion and/or an end of the spindle rod is rotatably received in the inner sleeve. Alternatively, a cylindrical outer circumference of the spindle nut can be rotatably received in the inner sleeve.

The elastically deformable bars can extend, parallel or obliquely to the longitudinal axis of the spindle rod, from the region of the first end of the bearing device in the direction of the region of the second end of the bearing device. In one exemplary arrangement, the longitudinal axis and a centre longitudinal axis of the inner sleeve coincide.

According to a further exemplary arrangement, the inner sleeve has, in the region of the first end of the bearing device, an annular, outer flange extending radially outwards with respect to the longitudinal axis. In one exemplary arrangement, the outer flange is connected to and/or formed in one piece with the inner sleeve. All or at least some, and in one exemplary arrangement, half, of the elastically deformable bars are fastened in or on the outer flange. Ends of the bars can be connected to the outer flange in one piece or in an integrally bonded or form-fitting manner. The outer flange has receptacles in each of which one end of a bar is fixed, for example pressed in and/or held in an integrally bonded manner. The receptacles can take the form of cutouts or holes. The bars extend from the outer flange in the direction of the second end of the bearing device. The bars extend so as to be spaced apart from and/or parallel to an outer side of the inner sleeve from the region of the first end of the bearing device into the region of the second end of the bearing device.

According to a development, ends of the elastically deformable bars that are arranged facing away from the outer flange are fastened in or on an annular disc. These ends of the bars can be connected to the annular disc in one piece or in an integrally bonded or form-fitting manner. For example, the annular disc has receptacles in each of which one end of a bar is fixed, and in one exemplary arrangement, pressed in and/or held in an integrally bonded manner. The receptacles can take the form of cutouts or holes. The annular disc encircles the inner sleeve, wherein a first gap is formed between the outer side of the inner sleeve and an inner side of the annular disc. Here, the inner side can at the same time determine or define an inside diameter of the annular disc. In one exemplary arrangement, a radial, compensating movement is made possible by the first gap. Here, the annular disc can at the same time realize a stop which limits the compensating movement. In one exemplary arrangement, a width of the first gap determines a maximum compensating movement, for example, radially to the longitudinal axis.

The bars can be arranged so as to be uniformly distributed in the circumferential direction around the inner sleeve. Alternatively, the bars can be arranged so as to be distributed non-uniformly, in predetermined groups or in pairs in the circumferential direction around the inner sleeve.

According to a further exemplary arrangement, the annular disc is connected to an, in particular hollow cylindrical, outer sleeve. For example, the outer sleeve has a diameter which is greater than a diameter of the inner sleeve. In one exemplary arrangement, the annular sleeve is connected to and/or formed in one piece with the outer sleeve. Consequently, the annular disc can be a one-piece constituent part of the outer sleeve. Starting from the annular disc, the outer sleeve extends in the direction of the outer flange of the inner sleeve. Here, the elastically deformable bars are received or arranged in an interspace between the inner sleeve and the outer sleeve. In one exemplary arrangement, the outer sleeve encircles or runs around the outer flange of the inner sleeve. Here, a second gap is formed between the inner side of the outer sleeve and an outer side of the outer flange. The outer side can determine or define an outside diameter of the outer flange. In one exemplary arrangement, a radial, compensating movement is made possible by the second gap. Here, the outer sleeve can at the same time realize a stop which limits the compensating movement. In exemplary arrangement, a width of the second gap determines a maximum compensating movement, for example, radially to the longitudinal axis.

According to an alternative development, the annular disc is designed as an independent component. In particular, according to this exemplary arrangement, the annular disc is not a one-piece constituent part of a further part or element. Here, a first set of a plurality of elastically deformable bars extends from the outer flange of the inner sleeve to the annular disc. A second set of a plurality of elastically deformable bars extends from the annular disc in the direction of the first end of the bearing device. Here, the bars of the second set are fastened in or on a radially inwardly extending, in particular annular, inner flange. The ends of the bars that face the inner flange and/or the ends of the bars that face the annular disc can be connected to the inner flange or the annular disc in one piece or in an integrally bonded or form-fitting manner. In one exemplary arrangement, the inner flange and/or the annular disc have or has receptacles in each of which one end of a bar is fixed, for example pressed in and/or held in an integrally bonded manner. The receptacles can take the form of cutouts or holes.

In one exemplary arrangement, the bearing device with the annular disc designed as an independent component has an outer sleeve which extends from the first end of the bearing device up to the second end of the bearing device, wherein the outer sleeve has the inner flange in the region of the first end of the bearing device. Here, a second gap is formed between an inner side of the outer sleeve and an outer side of the annular disc. The outer side of the annular disc can determine or define an outside diameter of the annular disc. For example, a further gap is formed between an inner side of the inner flange and an outside diameter of the outer flange. Here, the inner side can determine or define an inside diameter of the inner flange. In one exemplary arrangement, a radial, compensating movement can be made possible by the second gap and/or the further gap. Here, the outer sleeve and/or the inner flange can at the same time realize a stop which limits the compensating movement. A width of the second gap and/or of the further gap determines a maximum compensating movement, for example, radially to the longitudinal axis.

In one exemplary arrangement, the bars of the second set extend so as to be spaced apart from and/or parallel to an inner side of the outer sleeve. The bars of the first set and of the second set may extend in an interspace between the inner side of the outer sleeve and the outer side of the inner sleeve. The bars of the first set may extend so as to be spaced apart from and/or parallel to the outer side of the inner sleeve.

According to a further exemplary arrangement, the bars of the first set and/or of the second set are arranged in pairs. Here, the paired bars of the first set can be arranged and/or oriented with respect to one another in such a way that two bars of a pair of the first set have a maximum spacing in the region of the outer flange and a minimum spacing in the region of the annular disc. Furthermore, the paired bars of the second set can be arranged and/or oriented with respect to one another in such a way that two bars of a pair of the second set have a minimum spacing in the region of the annular disc and a maximum spacing in the region of the inner flange. For example, the bars so arranged in pairs each form a triangle or span a triangle. Forces and/or torques can be better transmitted on account of this arrangement of the bars with respect to one another.

In one exemplary arrangement, the first set has two pairs of bars and the second set has two pairs of bars. Here, the two pairs of the first set are arranged mirror-symmetrically to a first centre plane and the two pairs of the second set are arranged mirror-symmetrically to a second centre plane, wherein the two centre planes intersect. In one exemplary arrangement, the intersection may be at right angles. The two centre planes coincide with the longitudinal axis of the spindle rod.

According to a development, the bearing device is received and fixed in a bearing housing. For example, the spindle device and/or a steering device have or has the bearing housing. The bearing housing can have a multi-part design or can also be composed of a plurality of housing parts. Here, the inner sleeve and/or the annular disc and/or the outer sleeve of the bearing device are or is received and/or held in the bearing housing so as to be immovable in the axial direction of the longitudinal axis. The inner sleeve and/or the annular disc and/or the outer sleeve bear or bears against at least one bearing surface of the bearing housing. This makes it possible to prevent undesired movements in the axial direction of the longitudinal axis in which a force or a torque is intended to be transmitted. For example, in a steering device, forces and/or torques can thus be transmitted in the axial direction of the longitudinal axis of the spindle rod in favour of an integrated crash function and/or for an energy-absorption device in the event of an accident.

One advantage that may be achieved is a steering device for a vehicle, in particular a motor vehicle. In one exemplary arrangement, the vehicle has the steering device according to the disclosure. The steering device has an electromechanical adjusting device for adjusting a steering column, wherein the electromechanical adjusting device has a spindle device according to the disclosure. For example, the adjusting device has a plurality of spindle devices. Here, an individual spindle device of the plurality of spindle devices, a selection of the plurality of spindle devices or all of the plurality of spindle devices can be formed according to the spindle device according to the disclosure.

The steering column can be connected to a steering wheel. Within the scope of the present application, the term "steering wheel" represents any possible design and configuration of a steering handle for steering the vehicle, wherein the steering handle is connected to the steering column.

In one exemplary arrangement, the steering column can be adjusted by the adjusting device in the longitudinal direction of the steering column and/or in terms of an inclination of the steering column. As a result of a longitudinal displacement and/or a change in the inclination of the steering column, the position of the steering column and hence the position of the steering wheel can be adapted to the individual wishes and the physiognomy of the user. The steering device can have a control device for controlling the adjusting device.

In one exemplary arrangement, the steering device is developed according to the exemplary arrangements explained in conjunction with the spindle device according to the disclosure described here.

BRIEF DESCRIPTION OF DRAWINGS

The disclosure will be explained in more detail below on the basis of the figures. Here, identical reference signs refer to identical, similar or functionally identical components or elements. In the figures.

DETAILED DESCRIPTION

Figure 1:
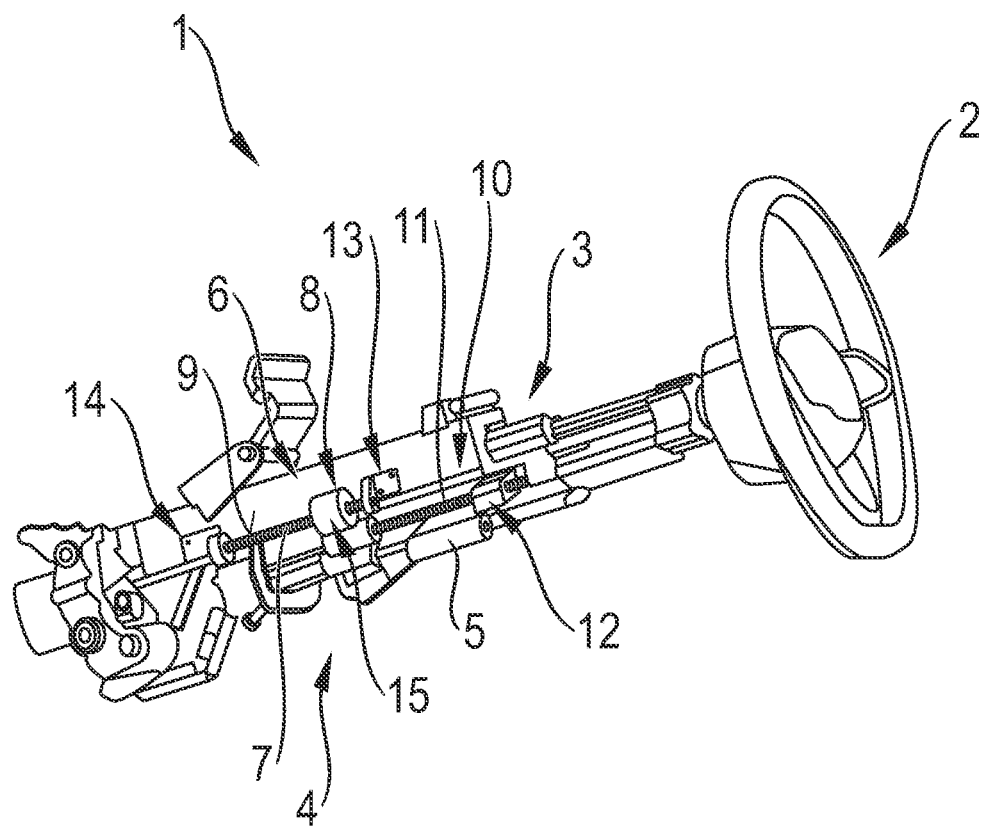
FIG. 1 shows a perspective side view of a steering device according to the disclosure.

FIG. 1 shows a perspective side view of a steering device 1 according to the disclosure. The steering device 1 is designed for steering a vehicle or motor vehicle which is not shown in further detail here. For this purpose, the steering device 1 has a steering wheel 2. The steering wheel 2 is connected to a steering column 3. According to this exemplary arrangement, the steering device 1 is realized as a steer-by-wire steering system. Alternatively, the steering device can be designed as a mechanical or electromechanical steering system, for example as a servo steering system.

Furthermore, the steering device 1 has an electromechanical adjusting device 4. Here, the steering column 3 can be adjusted by the adjusting device 4 in the longitudinal direction of the steering column 3 and/or in terms of an inclination of the steering column 3. To control the adjusting device 4, the steering device 1 has a control device which is not shown in further detail here. To adjust the steering column 3, the adjusting device 4 has at least one electric drive 5.

In this exemplary arrangement, the adjusting device 4 has a spindle device 6. The spindle device 6 has a spindle rod 7 and a spindle nut 8. In this exemplary arrangement, the spindle nut 8 is, in a manner which is not shown in further detail, of multi-part design. Here, an internal thread (which is also not shown in further detail here) of the spindle nut 8 interacts with an external thread 9 of the spindle rod 7. In this exemplary arrangement, the steering device 1 has a further spindle device 10 with a further spindle rod 11 and a further spindle nut 12. The further spindle device 10 can be designed to correspond to the spindle device 6. Only the spindle device 6 will be discussed in further detail below.

In the spindle device 6 shown here, the spindle nut 8 is rotatable about a longitudinal axis of the spindle rod 7. Two ends of the spindle rod 7 that face away from one another are each arranged in a respective holder 13 or 14 and, according to this exemplary arrangement, fixed in the holders 13, 14. In this exemplary arrangement, the rotatable spindle nut 8 is mounted in a bearing device 15 (which cannot be seen in further detail here) or the spindle nut 8 of multi-part design has the bearing device 15.

Figure 2:
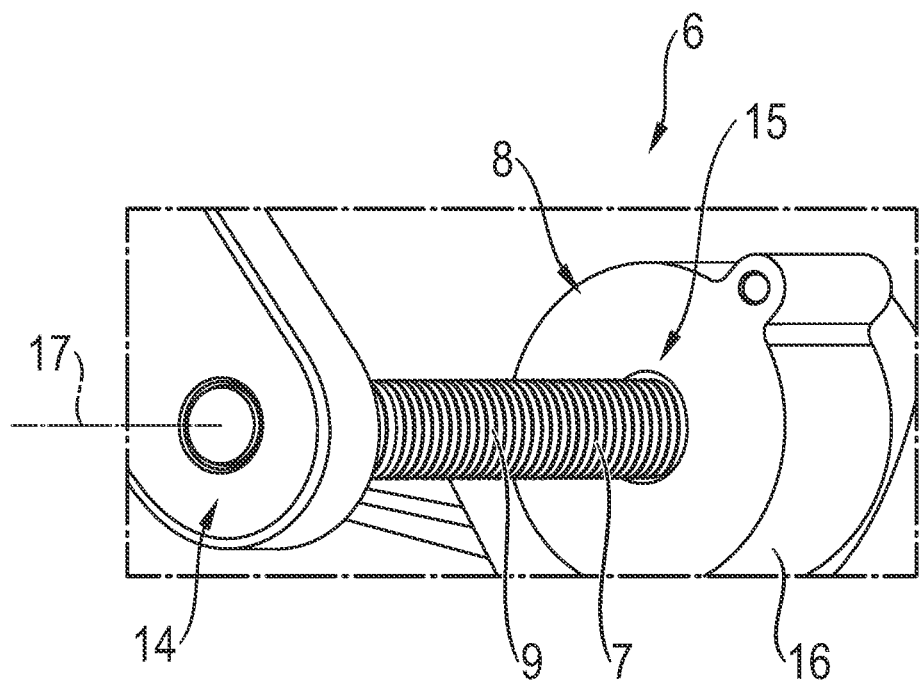
FIG. 2 shows a detail of a perspective side view of a spindle device according to the disclosure for a steering device as shown in FIG. 1.

FIG. 2 shows a detail of a perspective side view of the spindle device 6 according to the disclosure for the steering device 1 according to FIG. 1. The bearing device 15 (which cannot be seen in further detail here) is received in a bearing housing 16. The bearing device 15 allows compensating movements for the spindle rod 7 and/or the spindle nut 8, these compensating movements being oriented at least radially to a longitudinal axis 17 (which is schematically indicated here) of the spindle rod 7. This makes it possible to compensate for production tolerances or out-of-roundness of the spindle nut 8 and/or of the spindle rod 7.

Additionally or alternatively, a bearing device 15 for mounting the spindle rod 7 can be arranged in the holder 14 and/or the holder 13 according to FIG. 1.

Figure 3:
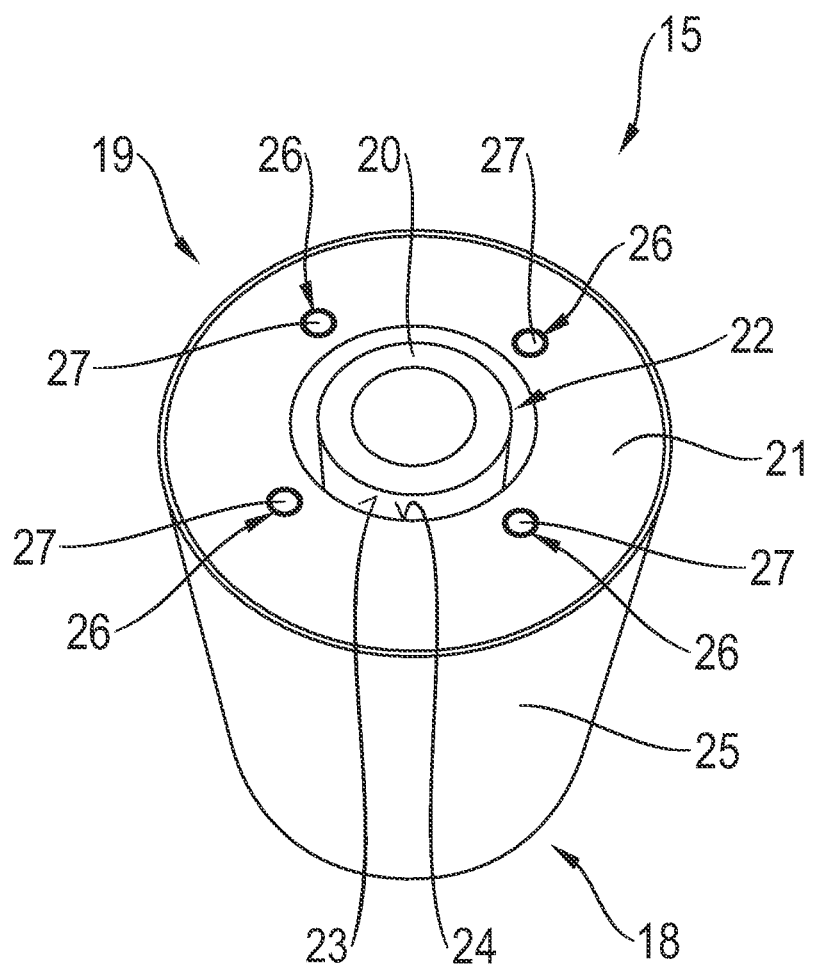
FIG. 3 shows a perspective plan view of a first bearing device for the spindle device according to the disclosure as shown in FIG. 2.

FIG. 3 shows a perspective plan view of a first bearing device 15 for the spindle device 6 according to the disclosure as shown in FIG. 2. Here, the bearing device 15 is illustrated only schematically and not true to scale.

The bearing device 15 has a first end 18 and a second end 19 facing away from the first end 18. The bearing device 15 has a hollow cylindrical inner sleeve 20. Here, the inner sleeve 20 extends from the first end 18 up to the second end 19.

In the exemplary arrangement according to FIGS. 1 and 2, the spindle nut 8 is received and mounted so as to be rotatable in the inner sleeve 20. According to an alternative arrangement, the spindle rod 7 can be mounted in the inner sleeve 20 of the bearing device 15. In this case, a bearing device 15 is received in the holder 13 and/or the holder 14, as can be seen from FIGS. 1 and 2.

The bearing device 15 has an annular disc 21. The annular disc 21 encircles the inner sleeve 20. Here, there is a first gap 22 between an outer side 23 of the inner sleeve 20 and an inner side 24 of the annular disc 21. In this exemplary arrangement, the outer side 23 of the inner sleeve 20 is realized as a cylinder lateral surface. The inner side 24 of the annular disc 21 determines an inside diameter of the annular disc 24. The inner side 24 is also realized as a cylinder lateral surface.

Here, the annular disc 21 can at the same time realize a stop for the inner sleeve 20 that limits a radial compensating movement. A width of the first gap 22 determines a maximum compensating movement radially to the longitudinal axis 17.

In this exemplary arrangement, the annular disc 21 is a one-piece constituent part of an outer sleeve 25. Starting from the annular disc 21, the outer sleeve 25 extends from the first end 18 in the direction of the second end 19. Here, the annular disc 21 is arranged in the region of the second end 19 of the bearing device 15.

Furthermore, in this exemplary arrangement, receptacles 26 can be seen in the annular disc 21 that here take the form, by way of example, of cutouts or holes. Here, by way of example, a total of four receptacles 26 are formed uniformly in the annular disc 21 as viewed in the circumferential direction. One end 27 of an elastically deformable bar (which is not illustrated in further detail here) is fixed in each of the receptacles 26.

Figure 4:
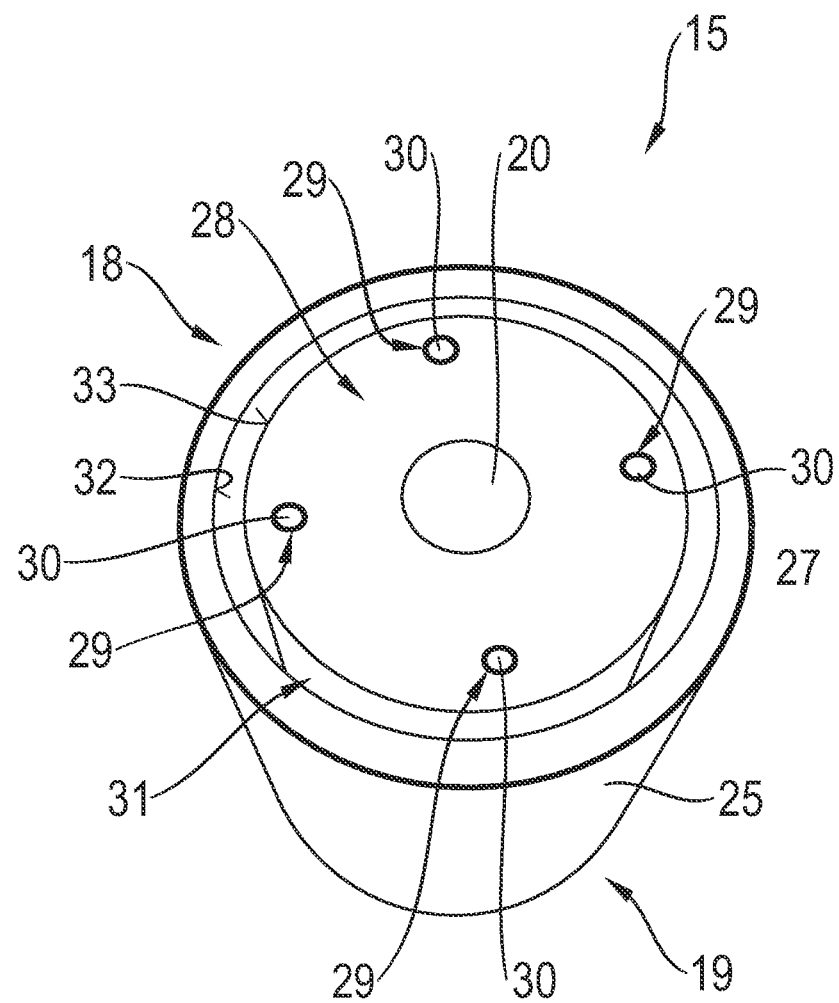
FIG. 4 shows a perspective further plan view of the first bearing device as shown in FIG. 3.

FIG. 4 shows a perspective further plan view of the first bearing device 15 according to FIG. 3. In the region of the first end 18 of the bearing device 15, the inner sleeve 20 has an annular and radially outwardly extending outer flange 28. The outer flange 28 has a plurality of receptacles 29 which are here designed in a corresponding manner to the receptacles 26 as cutouts or holes. In this exemplary arrangement, a total of four receptacles 29 are formed so as to be uniformly distributed in the outer flange 28 as viewed in the circumferential direction. In each of the receptacles 29 there is fixed one end 30 of the bars (which cannot be seen in further detail here) that faces away from the ends 27 according to FIG. 3.

The outer sleeve 25 encircles the outer flange 28, wherein a second gap 31 is formed between an inner side 32 of the outer sleeve 25 and an outer side 33 of the outer flange 28. In this exemplary arrangement, the inner side 32 of the outer sleeve 25 is realized as a cylinder lateral surface. The outer side 33 of the outer flange 28 determines an outside diameter of the outer flange 28. The outer side 33 is also realized as a cylinder lateral surface.

A radial compensating movement is made possible by the first gap 22 and of the second gap 31. Here, the outer sleeve 25 and the annular disc 21 can each realize a stop which limits the compensating movement. Here, a width of the first gap 22 and of the second gap 31 determines a maximum compensating movement radially to the longitudinal axis 17.

Figure 5:
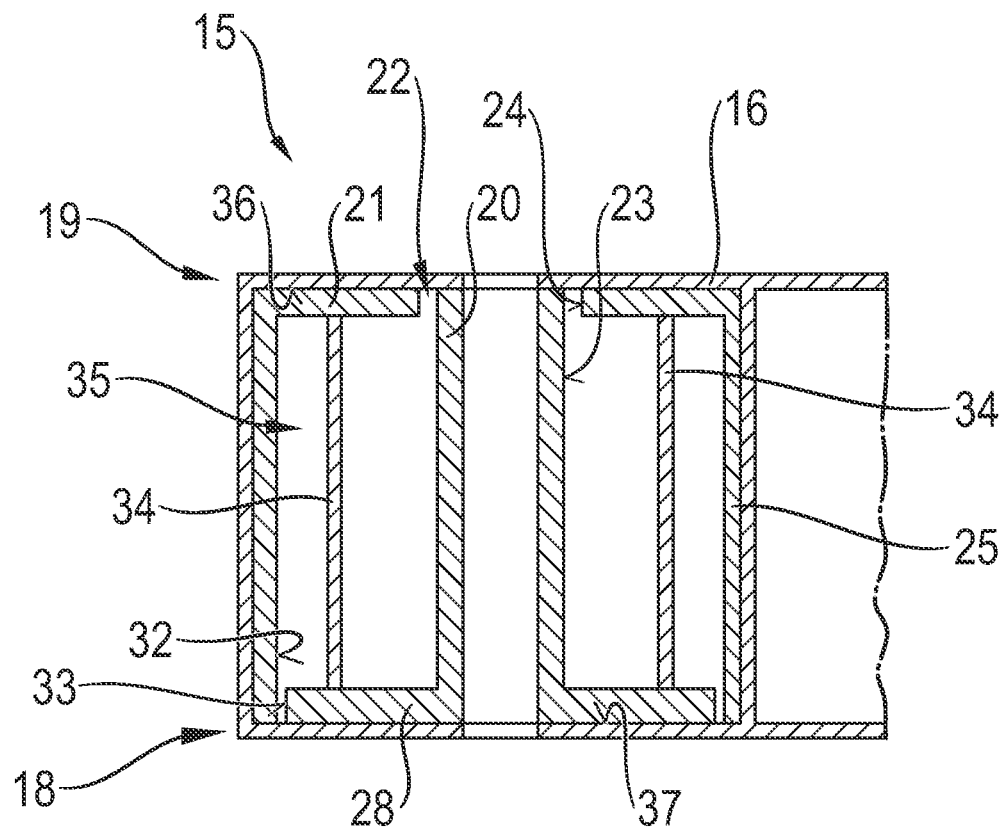
FIG. 5 shows a sectioned, schematic side view of the first bearing device as shown in FIGS. 3 and 4 in a bearing housing.

FIG. 5 shows a sectioned, schematic side view of the first bearing device 15 according to FIGS. 3 and 4 and in the bearing housing 16 according to FIG. 2. It can be clearly seen that the bearing device 15 has a plurality of elastically deformable bars 34 for realizing the compensating movements. In this sectional illustration, two of the total of four bars 34 according to this exemplary arrangement can be seen. In this exemplary arrangement, the bars 34 are formed from a spring steel.

In this exemplary arrangement, the bars 34 extend parallel to the longitudinal axis 17 according to FIG. 2. Here, the bars 34 extend from the region of the first end 18 of the bearing device 15 in the direction of the region of the second end 19 of the bearing device 15. Specifically, the bars 34 extend from the outer flange 28 to the annular disc 21. Here, the bars 34 are received in an interspace 35 between the inner sleeve 20 and the outer sleeve 25.

In this exemplary arrangement, the bearing device 15 is received and fixed in the bearing housing 16 in such a way that the inner sleeve 20, the annular disc 21, the outer sleeve 25 and the outer flange 28 are received in the bearing housing 16 so as to be immovable in the axial direction of the longitudinal axis 17 according to FIG. 2. For this purpose, the inner sleeve 20, the annular disc 21, the outer sleeve 25 and the outer flange 28 bear against two mutually facing and opposite bearing surfaces 36, 37 of the bearing housing 16. In this exemplary arrangement, the bearing device 15 thus makes possible, by the elastically deformable bars 34, compensating movements which are oriented exclusively radially to the longitudinal axis 17 according to FIG. 2.

Figure 6:
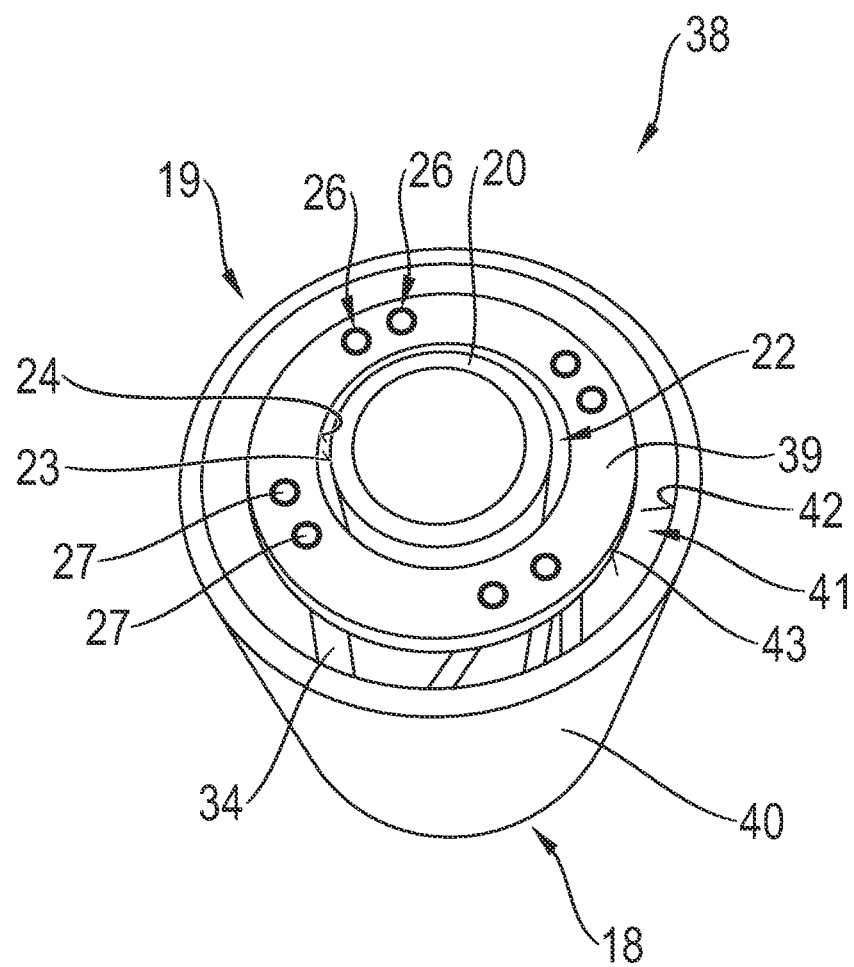
FIG. 6 shows a perspective plan view of a further bearing device for the spindle device according to the disclosure as shown in FIG. 2.

FIG. 6 shows a perspective plan view of a further bearing device 38 for the spindle device 6 according to the disclosure as shown in FIG. 2. Here, the bearing device 38 can be used as an alternative to the bearing device 15 according to FIGS.

1 to 5. Identical features bear the same reference signs as above. In this respect, reference is also made to the preceding description.

The bearing device 38 also has an inner sleeve 20. Furthermore, the bearing device 38 has an annular disc 39 which is designed in a similar manner to the annular disc 21 of the bearing device 15 according to FIGS. 1 to 5. However, in the bearing device 38, the annular disc 39 is designed as an independent component. Thus, in the bearing device 38, the annular disc 39 is not a one-piece constituent part of an outer sleeve 40 provided here. The annular disc 39 is arranged in the region of the second end 19 of the bearing device 38.

As in the bearing device 15, the first gap 22 is also formed in the bearing device 38 illustrated here between the outer side 23 of the inner sleeve 20 and the inner side 24 of the annular disc 39. The first gap 22 is arranged in the region of the second end 19.

In the bearing device 38 shown here, a second gap 41 is also formed in the region of the second end 19 of the bearing device 38 between an inner side 42 of the outer sleeve 40 and an outer side 43 of the annular disc 39. In this exemplary arrangement, the inner side 42 of the outer sleeve 40 is realized as a cylinder lateral surface. The outer side 43 of the annular disc 39 determines an outside diameter of the annular disc 39. The outer side 43 is also realized as a cylinder lateral surface.

The annular disc 39 has a plurality of receptacles 26, which here also take the form of cutouts or holes. However, in this exemplary arrangement, the annular disc 39 has a total of eight receptacles 26. Here, in each case two receptacles 26 are arranged in pairs such that a total of four pairs of receptacles 26 result. Here, the four pairs of receptacles 26 are formed on the annular disc 39 so as to be uniformly distributed in the circumferential direction. For the sake of better clarity, not all the receptacles 26 of the annular disc 39 are provided with a reference sign.

One end 27 of an elastically deformable bar 34 is fixed in each of the receptacles 26. For the sake of better clarity, not all the ends 27 are provided with a reference sign.

Figure 7:
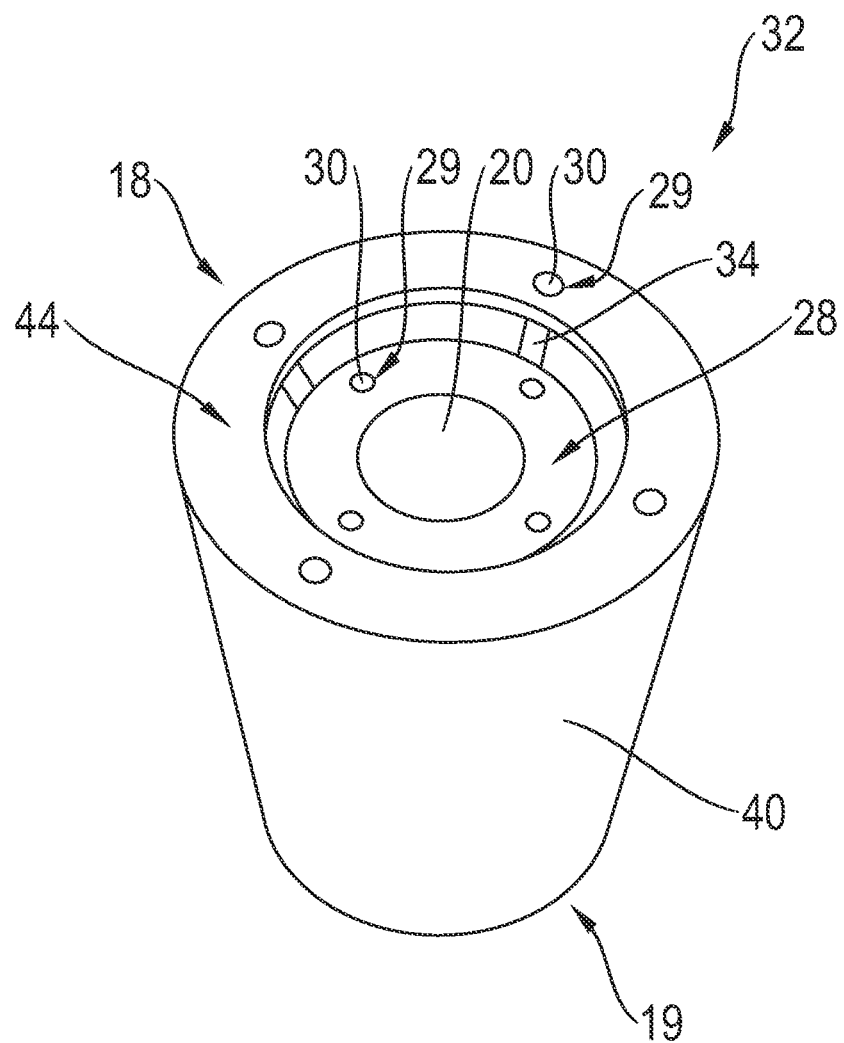
FIG. 7 shows a perspective further plan view of the further bearing device as shown in FIG. 6.

FIG. 7 shows a perspective further plan view of the further bearing device 38 according to FIG. 6. There can be seen the inner sleeve 20 with its outer flange 28 and also the four receptacles 29, which are formed in the outer flange 28, for the ends 30 of the bars 34.

The outer sleeve 40 has a radially inwardly extending, annular inner flange 44 in the region of the first end 18 of the bearing device 38. In this exemplary arrangement, the inner flange 44 also has four receptacles 29 which are formed on the inner flange 44 so as to be distributed uniformly in the circumferential direction thereof. Here, in each case one end 30 of a bar 34 is fixed in one of the receptacles 29. For the sake of better clarity, not all the receptacles 29 and ends 30 are provided with a reference sign.

Figure 8:
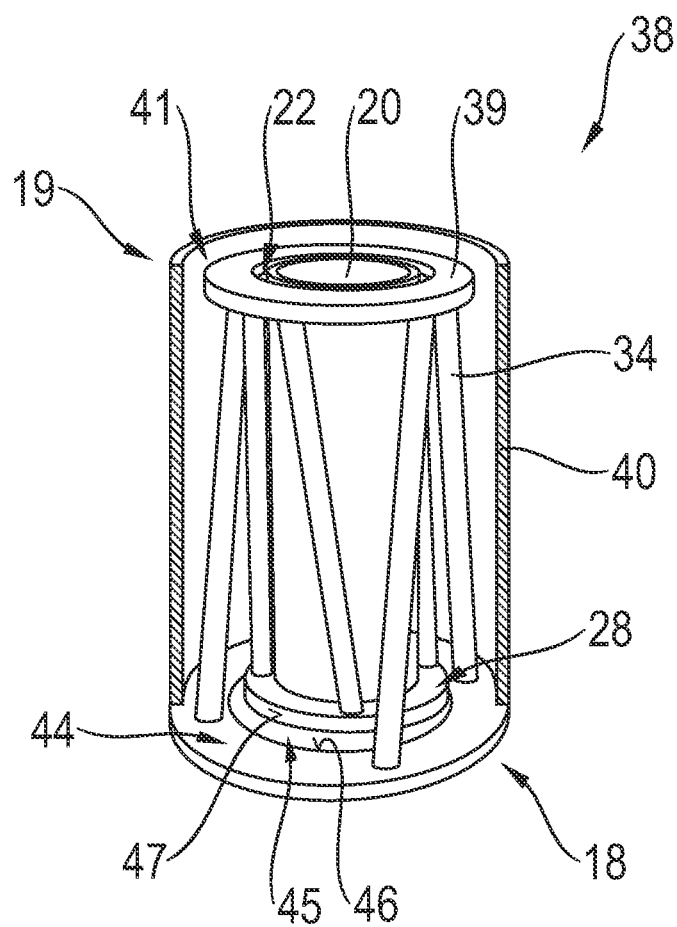
FIG. 8 shows a partially sectioned side view of the further bearing device as shown in FIGS. 6 and 7.

FIG. 8 shows a partially sectioned side view of the further bearing device 38 according to FIGS. 6 and 7. It can clearly be seen that a further gap 45 is formed between an inner side 46 of the inner flange 44 and an outer side 47 of the outer flange 28. In this exemplary arrangement, the inner side 46 of the inner flange 44 is realized as a cylinder lateral surface. The outer side 47 of the outer flange 28 determines an outside diameter of the outer flange 28. The outer side 47 is also realized as a cylinder lateral surface.

In this exemplary arrangement, the inner flange 44 projects outwardly with respect to the outer flange 28 radially to the longitudinal axis 17 of the spindle rod 7 according to FIG. 2. In other words, the outer flange 28 is arranged within the outer sleeve 40 in the region of the first end 18 of the bearing device 38. This arrangement is also already discernible in FIG. 7.

In the bearing device 38, bars 34 of a first set of bars 34 extend from the outer flange 28 of the inner sleeve 20 to the annular disc 39. Bars 34 of a second set of bars 34 extend from the annular disc 39 to the inner flange 44 of the outer sleeve 40. In this exemplary arrangement, each of the two sets comprises four bars 34.

The annular disc 39 can realize a stop for the inner sleeve 20 that limits a radial compensating movement. A radial compensating movement is made possible by the first gap 22, the second gap 41 and/or the further gap 45. Here, the outer sleeve 40 and the inner flange 44 can each realize a stop which limits the compensating movement. Here, a width of the first gap 22, of the second gap 41 and/or of the further gap 45 determines a maximum compensating movement radially to the longitudinal axis 17.

Figure 9:
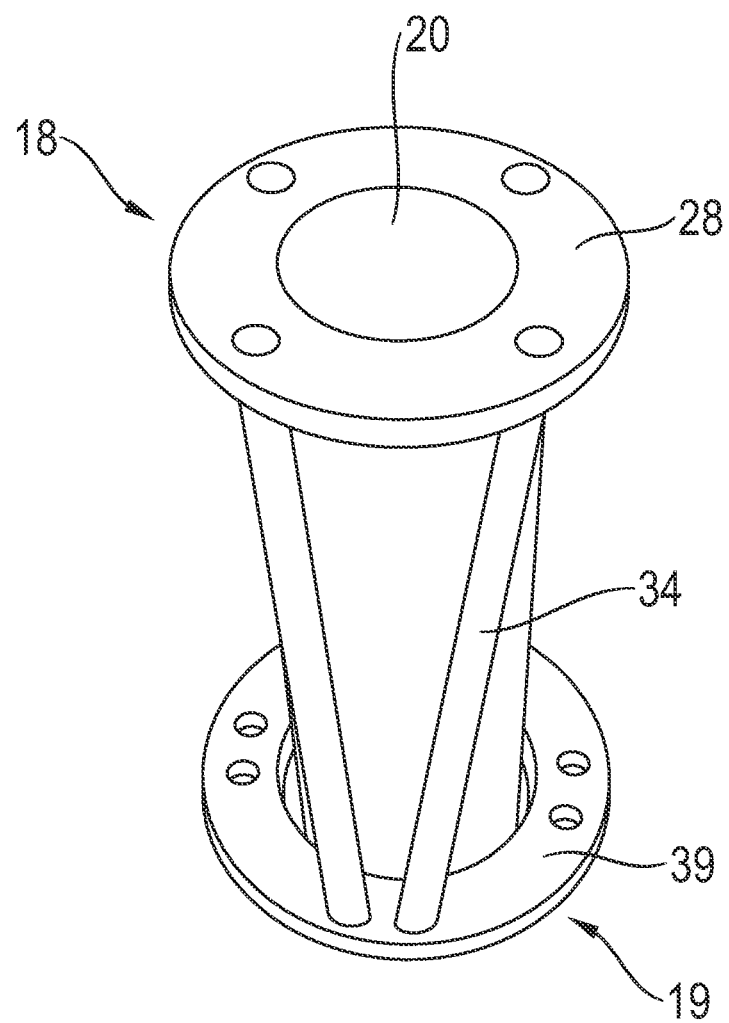
FIG. 9 shows a perspective side view of parts of the further bearing device as shown in FIG. 8.

FIG. 9 shows a perspective side view of parts of the further bearing device 38 according to FIG. 8. There can be seen the inner sleeve 20 with the outer flange 28 in the region of the first end 18 and the annular disc 39 in the region of the second end 19. Omitted here is the outer sleeve 40 with its inner flange 44. Moreover, only the first set of bars 34 is shown here, wherein the bars 34 of the first set are each arranged in pairs. Here, two bars 34 of a pair of the first set have a maximum spacing in the region of the outer flange 28 or of the first end 18 and a minimum spacing in the region of the annular disc 29 or in the region of the second end 19.

Figure 10:
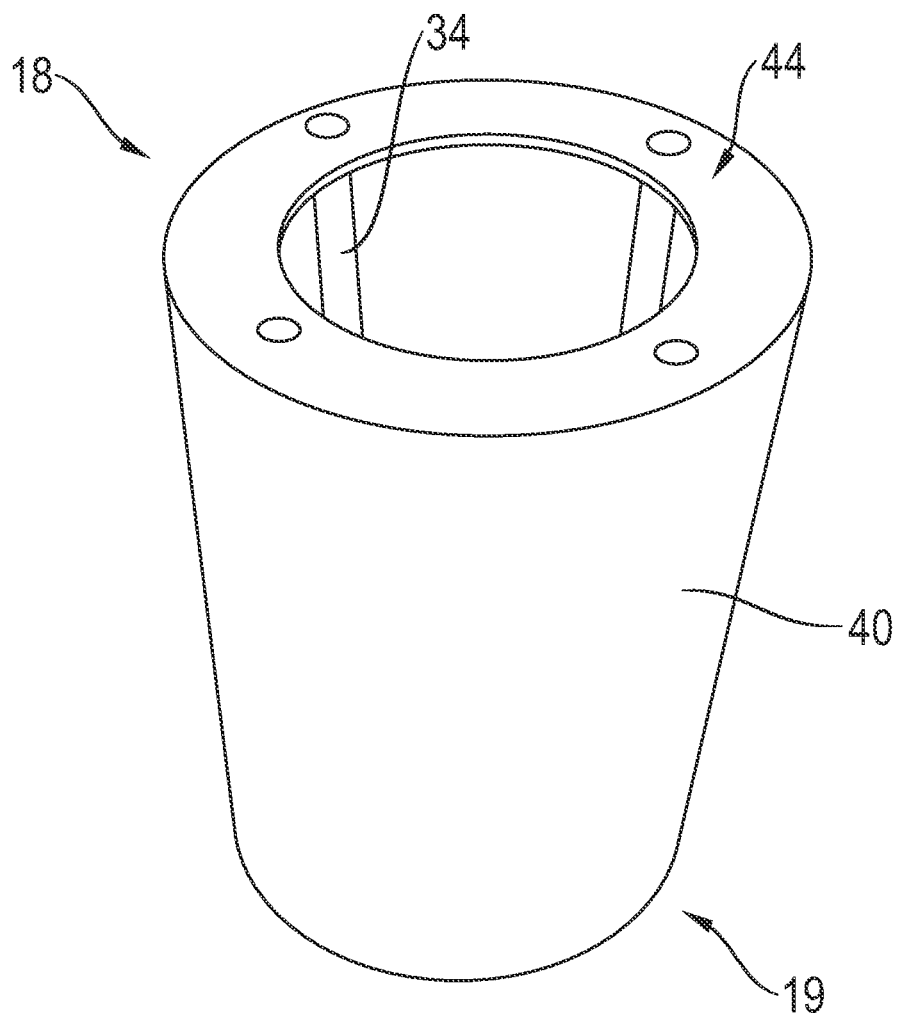
FIG. 10 shows a perspective side view of further parts of the further bearing device as shown in FIG. 8.

FIG. 10 shows a perspective side view of further parts of the further bearing device 38 according to FIG. 8. Here, the outer sleeve 40 with its radially inwardly directed inner flange 44 is shown. On the other hand, the inner sleeve 20 is omitted. Also illustrated here, insofar as they can be seen, are only the bars 34 of the second set.

Figure 11:
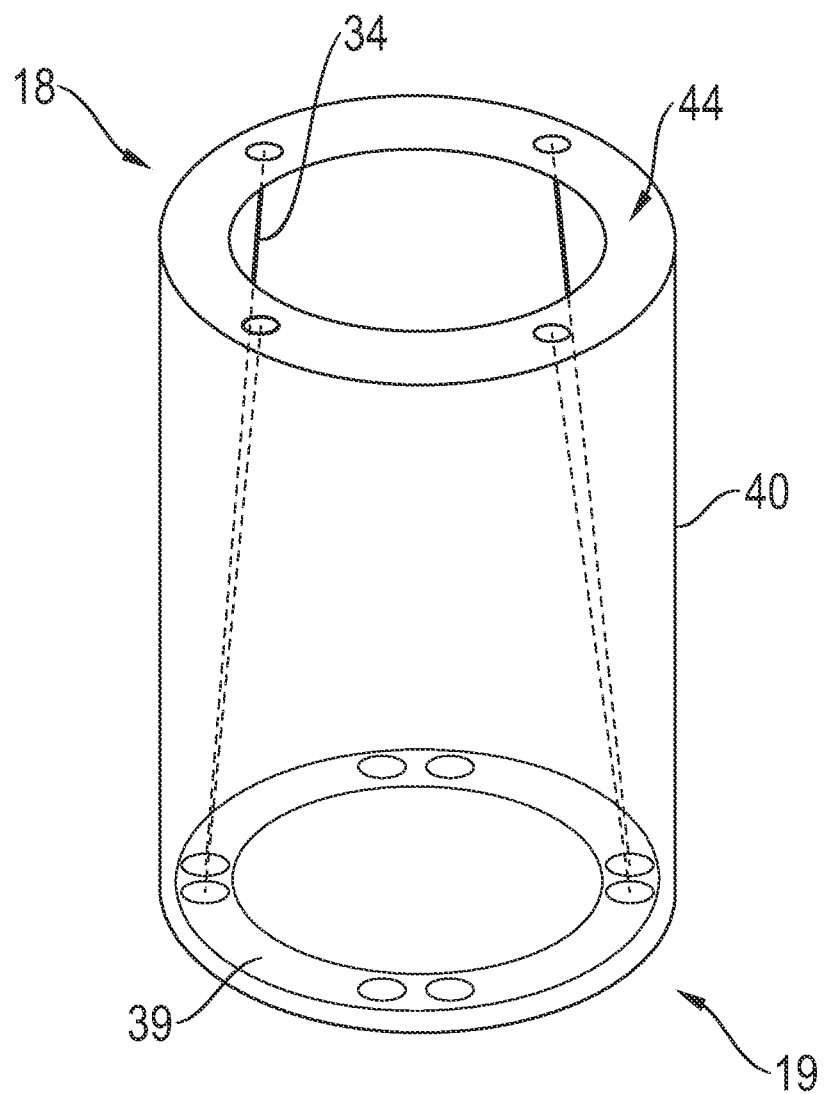
FIG. 11 shows a partially transparent, schematic side view of the further parts as shown in FIG. 10.

FIG. 11 shows a partially transparent, schematic side view of the further parts according to FIG. 10. The bars 34 of the second set of bars 34 illustrated here are also arranged in pairs. Here, two bars 34 of a pair of the second set have a minimum spacing in the region of the annular disc 39 or of the second end 19 and a maximum spacing in the region of the inner flange 44 of the outer sleeve 40 or of the first end 18.

With consideration of FIGS. 8 to 11, it can be seen that the two pairs of bars 34 of the first set are arranged mirror-symmetrically to an imaginary first centre plane and that the two pairs of bars 34 of the second set are arranged mirror-symmetrically to an imaginary second centre plane. In the mounted state according to FIG. 8, the two imaginary centre planes intersect at right angles. When comparing the bearing devices 15 and 38, the bearing device 38 makes it possible, unlike the bearing device 15, to achieve limited tilting or turning of the inner sleeve 20 about an axis of rotation which is at a right angle to the longitudinal axis 17 of the spindle rod 7 according to FIG. 1 or 2.

The invention claimed is:

1. A spindle device having a spindle rod and a spindle nut, wherein an internal thread of the spindle nut interacts with an external thread of the spindle rod, and the spindle rod and/or the spindle nut can be rotated about a longitudinal axis of the spindle rod, and having at least one bearing device in which the spindle rod or the spindle nut is mounted, wherein the bearing device allows compensating movements, which are oriented at least radially to the longitudinal axis, for the spindle rod and/or the spindle nut, wherein the bearing device has a plurality of elastically deformable bars for realizing the compensating movements.

2. The spindle device according to claim 1, wherein the bearing device has a first end and a second end facing away from the first end, wherein a hollow cylindrical inner sleeve of the bearing device extends from the first end up to the second end and the spindle rod or the spindle nut is mounted rotatably in the inner sleeve, and the elastically deformable bars extend from the region of the first end (18) of the bearing device (15, 38) in the direction of the region of the second end (19) of the bearing device (15, 38), and preferably the longitudinal axis (17) and a centre longitudinal axis of the inner sleeve (20) coincide.

3. Spindle device according to claim 2, wherein the inner sleeve has an annular, radially outwardly extending outer flange in a region of the first end of the bearing device, wherein all or at least some of the elastically deformable bars are fastened in or on the outer flange and extend from the outer flange in the direction of the second end of the bearing device.

4. The spindle device according to claim 3, wherein ends of the elastically deformable bars that are arranged facing away from the outer flange are fastened in or on an annular disc, wherein the annular disc encircles the inner sleeve and there is a first gap between the outer side of the inner sleeve and an inner side of the annular disc.

5. The spindle device according to claim 4, wherein the annular disc is connected to an outer sleeve, wherein the outer sleeve extends starting from the annular disc in the direction of the outer flange of the inner sleeve and the bars are received in an interspace between the inner sleeve and the outer sleeve.

6. The spindle device according to claim 1, wherein the annular disc is designed as an independent component, wherein a first set of a plurality of elastically deformable bars extends from the outer flange of the inner sleeve to the annular disc, and a second set of a plurality of elastically deformable bars extends from the annular disc in the direction of the first end of the bearing device, wherein the bars of the second set are fastened in or on a radially inwardly extending, annular, inner flange.

7. The spindle device according to claim 6, wherein the bearing device has an outer sleeve which extends from the first end of the bearing device up to the second end of the bearing device, wherein the outer sleeve has the inner flange in a region of the first end of the bearing device, and a second gap is formed between an inner side of the outer sleeve and an outer side of the annular disc, and there is a further gap between an inner side of the inner flange and an outer side of the outer flange, and the bars of the second set extend so as to be spaced apart from and/or parallel to an inner side of the outer sleeve.

8. The spindle device according to claim 6 wherein the bars of the first set and/or of the second set are arranged in pairs.

9. The spindle device according to claim 8, wherein the first set has two pairs of bars and the second set has two pairs of bars, wherein the two pairs of the first set are arranged mirror-symmetrically to a first centre plane and the two pairs of the second set are arranged mirror-symmetrically to a second centre plane, wherein the two centre planes intersect.

10. The spindle device according to claim 2, wherein the bearing device is received and fixed in a bearing housing, wherein the inner sleeve and/or an annular disc and/or an outer sleeve of the bearing device are or is received in the bearing housing so as to be immovable in the axial direction of the longitudinal axis.

11. A steering device for a vehicle, having an electromechanical adjusting device for adjusting a steering column, wherein the electromechanical adjusting device has a spindle device according to claim 1.

12. The spindle device of claim 2, wherein the the elastically deformable bars extend parallel or obliquely to the longitudinal axis of the spindle rod.

13. The spindle device of claim 3, wherein the bars extend so as to be spaced apart from and/or parallel to an outer side of the inner sleeve.

14. The spindle device of claim 4, wherein the bars are arranged so as to be uniformly distributed in the circumferential direction around the inner sleeve.

15. The spindle device of claim 5, wherein the outer sleeve encircles the outer flange of the inner sleeve, wherein there is a second gap between the inner side of the outer sleeve and an outer side of the outer flange.

16. The spindle device according to claim 4, wherein the annular disc is designed as an independent component, wherein a first set of a plurality of elastically deformable bars extends from the outer flange of the inner sleeve to the annular disc, and a second set of a plurality of elastically deformable bars extends from the annular disc in the direction of the first end of the bearing device, wherein the bars of the second set are fastened in or on a radially inwardly extending, annular, inner flange.

17. The spindle device of claim 8, wherein two bars of a pair of the first set have a maximum spacing in the region of the outer flange and a minimum spacing in a region of the annular disc, and two bars of a pair of the second set have a minimum spacing in the region of the annular disc and a maximum spacing in the region of the inner flange.

18. The spindle device of claim 9, wherein the two centre planes intersect at right angles, and the two centre planes coincide with the longitudinal axis.

19. The spindle device of claim 10, wherein the inner sleeve and/or the annular disc and/or the outer sleeve bear or bears against at least one bearing surface of the bearing housing.

* * * * *